US011157956B2

(12) United States Patent
Zhuo et al.

(10) Patent No.: US 11,157,956 B2
(45) Date of Patent: Oct. 26, 2021

(54) APPLICATION RECOMMENDATION METHOD AND SERVER

(71) Applicant: TENCENT TECHNOLOGY (SHENZHEN) COMPANY LIMITED, Guangdong (CN)

(72) Inventors: Ju Chao Zhuo, Shenzhen (CN); Xun Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/194,629

(22) Filed: Nov. 19, 2018

(65) Prior Publication Data

US 2019/0114668 A1 Apr. 18, 2019

Related U.S. Application Data

(63) Continuation of application No. PCT/CN2017/100989, filed on Sep. 8, 2017.

(30) Foreign Application Priority Data

Sep. 13, 2016 (CN) .......................... 201610821406.5

(51) Int. Cl.
  *G06Q 30/02* (2012.01)
  *G06F 16/00* (2019.01)
  *G06Q 30/06* (2012.01)

(52) U.S. Cl.
  CPC ......... *G06Q 30/0256* (2013.01); *G06F 16/00* (2019.01); *G06Q 30/0627* (2013.01); *G06Q 30/0631* (2013.01)

(58) Field of Classification Search
  None
  See application file for complete search history.

(56) References Cited

U.S. PATENT DOCUMENTS 8,918,387 B1 * 12/2014 Sokolov .................. G06F 21/57
  707/707
8,954,413 B2 * 2/2015 Clark .................. G06F 16/9535
  707/706

(Continued)

FOREIGN PATENT DOCUMENTS

CN   103514191 A   1/2014
CN   103942279 A   7/2014

(Continued)

OTHER PUBLICATIONS

International Search Report of PCT/CN2017/100989 dated Jan. 11, 2018 [PCT/ISA/210].

(Continued)

*Primary Examiner* — John Van Bramer
(74) *Attorney, Agent, or Firm* — Sughrue Mion, PLLC

(57) ABSTRACT

A method and apparatus are provided. The method includes prior to receiving a current search term from client application of a user among plural users, obtaining historical search terms entered by the user during a first time period and, for each historical search term, one or more historical applications accessed by the user after entering the historical search term, separately obtaining feature data of the historical search terms, the one or more historical applications and candidate applications, the feature data being data combined from all of the plurality of users, training the feature data according to a mining model, and obtaining through mining using the trained feature data, for each candidate application, a recommendation term corresponding to the candidate application. In response to receiving the current search term from the client application, one or more applications from the candidate applications are determined according to the current search term and the recommendation terms, and transmitted to the client application.

18 Claims, 7 Drawing Sheets

(56) References Cited

U.S. PATENT DOCUMENTS

| | | | | |
|---|---|---|---|---|
| 2006/0156326 | A1* | 7/2006 | Goronzy | H04N 21/25891 725/13 |
| 2008/0162537 | A1* | 7/2008 | Mancini | G06Q 30/02 |
| 2009/0248486 | A1* | 10/2009 | Gupta | G06Q 30/02 705/14.64 |
| 2009/0282023 | A1* | 11/2009 | Bennett | G06F 16/3326 |
| 2011/0320307 | A1* | 12/2011 | Mehta | G06Q 30/0641 705/26.7 |
| 2012/0271805 | A1* | 10/2012 | Holenstein | G06F 16/955 707/706 |
| 2013/0030954 | A1* | 1/2013 | Liu | G06Q 30/0246 705/26.7 |
| 2013/0282630 | A1* | 10/2013 | Attenberg | G06N 20/00 706/12 |
| 2015/0050633 | A1* | 2/2015 | Christmas | G06F 3/0484 434/322 |
| 2015/0242470 | A1* | 8/2015 | Ben-Itzhak | G06Q 30/02 707/722 |
| 2015/0278376 | A1* | 10/2015 | Qin | G06F 16/9535 707/706 |
| 2015/0293978 | A1* | 10/2015 | Huang | G06F 16/9535 707/722 |
| 2016/0188671 | A1* | 6/2016 | Gupta | H04L 51/14 707/722 |
| 2017/0177318 | A1* | 6/2017 | Mark | G06F 3/0482 |
| 2018/0032521 | A1* | 2/2018 | Boerschinger | G06F 16/313 |
| 2018/0107742 | A1* | 4/2018 | Kapoor | G06F 16/24578 |

FOREIGN PATENT DOCUMENTS

| | | | |
|---|---|---|---|
| CN | 104123332 A | 10/2014 | |
| CN | 105117440 A | 12/2015 | |
| CN | 105335391 A | 2/2016 | |
| CN | 105574030 A | 5/2016 | |
| CN | 105808685 A | 7/2016 | |
| WO | WO 2015/181591 | * 12/2015 | G06G 9/445 |
| WO | WO-2015181591 A1 | * 12/2015 | G06F 8/61 |

OTHER PUBLICATIONS

Written Opinion of the International Searching Authority dated Dec. 14, 2017 in PCT/CN2017/100989.

* cited by examiner

APPLICATION RECOMMENDATION METHOD AND SERVER

CROSS-REFERENCE TO RELATED APPLICATION

This application is a continuation of International Patent Application No. PCT/CN2017/100989, filed on Sep. 8, 2017, which claims priority from Chinese Patent Application No. 201610821406.5 entitled "APPLICATION RECOMMENDATION METHOD AND SERVER" filed with the Chinese Patent Office on Sep. 13, 2016, the disclosures of each of which are incorporated by reference herein in their entirety.

BACKGROUND

1. Field

This application relates to the field of Internet technologies, and particularly, to an application recommendation method and a server.

2. Description of Related Art

Due to rapid development of intelligent terminals, a user can search for and download required applications on an intelligent terminal. For the convenience of user searching, at present, there is one category of clients used as application releasing platforms. The clients may further present one or more advertised/promoted applications when providing applications searched for by users.

SUMMARY

It is an aspect to provide an application recommendation method and a server, to improve an application mining effect and a resource utilization rate of a client.

According to an aspect of one or more example embodiments, there is provided a method. The method includes, prior to receiving a current search term from client application of a user among plural users, obtaining historical search terms entered by the user during a first time period and, for each historical search term, one or more historical applications accessed by the user after entering the historical search term, separately obtaining feature data of the historical search terms, the one or more historical applications and candidate applications, the feature data being data combined from all of the plurality of users, training the feature data according to a mining model, and obtaining through mining using the trained feature data, for each candidate application, a recommendation term corresponding to the candidate application. In response to receiving the current search term from the client application, one or more applications from the candidate applications are determined according to the current search term and the recommendation terms, and transmitted to the client application.

According to other aspects of one or more example embodiments, there is also provided an apparatus and other methods consistent with the method above.

BRIEF DESCRIPTION OF THE DRAWINGS

Various example embodiments will be described below with reference to the accompanying drawings, in which.

DETAILED DESCRIPTION

The following clearly and completely describes the technical solutions in the example embodiments of this application with reference to the accompanying drawings in which the example embodiments of this application as shown. The described example embodiments are some example embodiments rather than all of the example embodiments. All other embodiments obtained by a person of ordinary skill in the art based on the example embodiments of this application without creative efforts shall fall within the protection scope of this application, and the appended claims.

In the related art technology, after a user enters search information, an application recommended to the user is usually determined based on only a search of text information of an application. However, because text information of an application is relatively sparse in an application search scenario, by using the text information-based recommendation method, it is difficult to obtain an application matching user requirements, leading to low recommendation efficiency, and reducing the application mining effect and the resource utilization rate of a client. That is, one of ordinary skill in the art will appreciate that as the number of applications to be searching increases, the computing resources, such as memory and processing, increase in order to perform the text information-based recommendation method because the amount of text to be searched increases.

In this application, a recommended application (APP) has a promotion function. For example, the application may be an advertisement APP provided by an advertiser, and an objective is to promote a product of the advertiser, or the application is a promotion-type APP for public welfare, for example, an APP for second-hand goods.

Figure 1A:
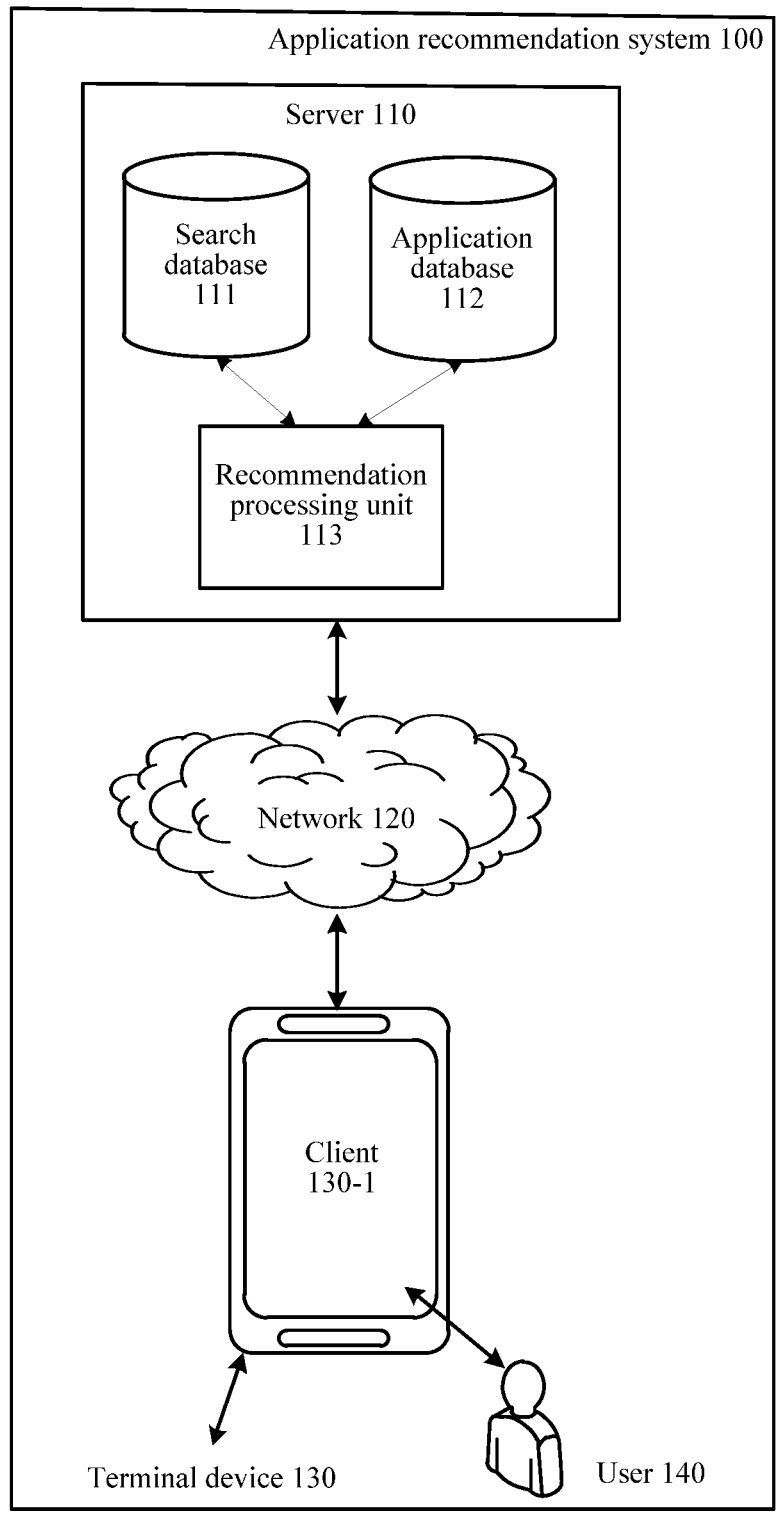
FIG. 1A is a schematic structural diagram of an application recommendation system according to an example embodiment of this application.

FIG. 1A is a schematic structural diagram of an application recommendation system according to an example embodiment. As shown in FIG. 1A, an application recommendation system 100 includes a server 110, a network 120, a terminal device 130, and a user 140. The server 110 includes a processor and a memory. A method example embodiment in the present disclosure is performed by the processor by executing an instruction stored in the memory. Specifically, the server 110 includes a search database 111, an application database 112, and a recommendation processing unit 113. A client 130-1 is installed on the terminal device 130. The client 130-1, as a client of an application releasing platform (for example, Yingyongbao APP), provides an application search function for the user 140. When the user 140 searches for a desired application on the client 130-1, the user 140 enters one or more current search terms, and when returning a common APP corresponding to the current search terms, the client 130-1 further pushes one or more advertisement APPs or promotion-type APPs for selection and downloading of the user 140.

In this example embodiment, the search database 111 stores historical search data of each application, and is updated in real time. The application database 112 stores related information of multiple candidate applications (i.e., applications that are to-be-recommended to a client), and the candidate applications include common APPs, advertisement APPs, and promotion-type APPs. The recommendation processing unit 113 is configured to read the historical search data stored in the search database 111 and feature data of the candidate applications in the application database 112, and when receiving, from the client 130-1, a current search term entered by the user 140, determine at least one to-be-presented application. Then, the server 110 sends the determined to-be-presented application to the client 130-1 in the terminal device 130, and the client 130-1 recommends and presents the application to the user 140.

The server 110 may be a server, a server cluster including several servers, or a cloud computation service center. The network 120 may connect the server 10 and the terminal device 130 in a wireless or wired manner. The terminal device 130 may be an intelligent terminal, including an intelligent mobile phone, a tablet computer, and a laptop portable computer.

Figure 1B:
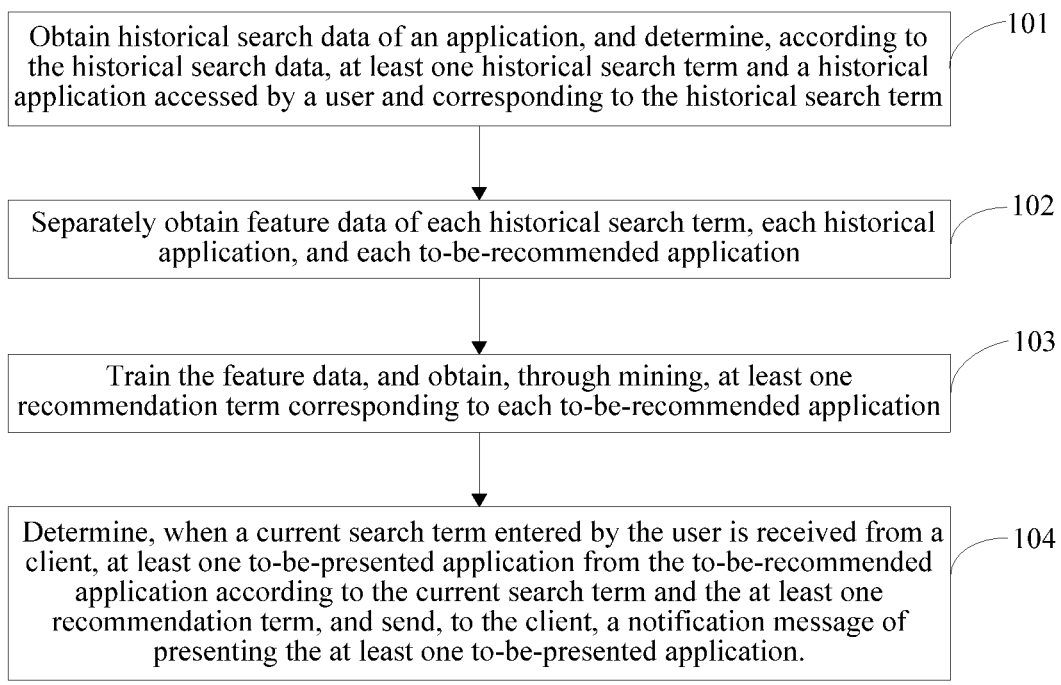
FIG. 1B is a schematic flowchart of an application recommendation method according to an example embodiment of this application.

FIG. 1B is a schematic flowchart of an application recommendation method according to an example embodiment of this application. The method is applied to a server. Referring to FIG. 1B, the method includes the following steps.

Step 101: Obtain historical search data of an application, and determine, according to the historical search data, at least one historical search term and a historical application accessed by a user and corresponding to the historical search term.

In this step, the server obtains the historical search data of the application from a search log. The historical search data includes historical search information entered by each user in a time period, and one or more historical applications accessed afterwards. Access herein means that a user clicks a web page link of an application or a user downloads an installation package of an application.

The historical search information entered by the user includes some redundant information, for example, includes a specific description word of the user. In view of this, after historical search information entered by the user when the user searches for an application is obtained from historical search data, the historical search information is segmented, and at least one key word is extracted as a historical search term. For example, historical search information entered by the user includes "funny Parkour", "latest Parkour", "2016 Parkour", after the three pieces of historical search information are segmented, a key word "Parkour" is extracted as a historical search term, and "funny", "latest", and "2016" are neglected as redundant information.

Because one historical search term may correspond to multiple historical applications, when each historical application accessed by a user and corresponding to each historical search term is determined, sorting processing may be performed. Specifically, for each historical search term, multiple historical applications corresponding to the historical search term are determined from historical search data, statistics is collected on a quantity of times that users access each historical application in a predetermined time period, the multiple historical applications are sorted according to the quantities of times, and the first L historical applications are used as the historical applications according to a sorting result, where L is a positive integer.

For example, a historical search term is "Parkour", and it is determined, according to the historical search data, that the term "Parkour" corresponds to four historical applications, namely, "Everyday Parkour", "Temple Run", "Nin-Jump", and "Crazy Grandma". Then, statistics is collected on a quantity of times of accessing each APP in half a year or one year, and the four historical applications are sorted according to the quantities of times. If L=3, the first three historical applications are determined as historical applications corresponding to the term "Parkour", namely, "Everyday Parkour", "Temple Run", and "Crazy Grandma".

Step 102: Separately obtain feature data of each historical search term, each historical application, and each candidate application.

In this example embodiment of this application, the feature data of the historical search term may be represented by using a measure or a grade representing a correlation degree between a search term and user search. Because each historical search term is related to a user entering the historical search term and has a different proportion in all historical search terms, when the feature data of each historical search term is obtained, the feature data includes one or more of the following four measures. However, the inventive concept is not limited to the following four measures and additional measures are contemplated.

(A1) Determine a degree at which the historical search term is entered by users concentratively, and use the degree as the feature data.

First, all users entering the historical search term in a time period and entering moments are used as basic data, entropy of the basic data is calculated to represent a concentration degree of user entering behaviors. A larger value of the entropy indicates looser user click behaviors, and a smaller value indicates more concentrative user click behaviors.

(A2) Use a quantity of times (QV) of entering the historical search term in a predetermined time period as the feature data.

For example, statistics is collected on a quantity of times that the historical search term "Parkour" is entered in half a year, and the quantity of times is used as feature data of "Parkour".

(A3) Use a length (QL) of the historical search term as the feature data.

Herein, the length of the historical search term is a quantity of words or a quantity of characters.

(A4) Use a frequency (Tf) at which the historical search term occurs in all historical search terms as the feature data.

Herein, a collection of all historical search terms is referred to as a bag-of-words, and a frequency at which each historical search term occurs in the bag-of-words is referred to as a word frequency (Tf), and is used to represent the sparsity or importance of the historical search term. A higher frequency at which a historical search term occurs in the bag-of-words indicates the lower importance of the historical search term. In other words, the importance of a historical search term is inversely proportional to the occurrence frequency of the historical search term. For example, if an occurrence frequency of the historical search term "Parkour"

is lower than that of another historical search term "Game", it indicates that the term "Parkour" is sparser and has higher importance.

A same or similar method may be used to extract feature data from each historical application and each candidate application. Feature data of an application may be represented by a type of the application belongs or text description information in different forms. Specifically, for each historical application or each candidate application, the obtained feature data includes one or more of the following measures. However, the inventive concept is not limited to the following measures, and additional measures are contemplated.

(B1) Use a type of the application as the feature data.

Applications have their own functions and may belong to different types, for example, social contact, tool, security, navigation, shooting, beautifying, and reading.

(B2) Obtain text description information of the application, segment the text description information, and obtain at least one description term as the feature data.

Each application corresponds to one piece of text description information. For example, text description information of an application "NinJump" is "Ninjia games about jumping and shuttling". Then, the text description information is segmented to obtain the following description terms: "jumping", "shuttling", "Ninjia", and "games", and the description terms are used as feature data of the application "NinJump".

(B3) Recognize the text description information, and obtain a thematic term of the application as the feature data.

For example, during specific implementation, latent Dirichlet allocation (LDA) may be used for recognition. LDA, as a thematic model, may be used to recognize theme information hidden in text description information, and give the theme information in a form of probability distribution.

(B4) Convert the text description information into a real value and use the real value as the feature data.

For example, during specific implementation, a word2vec tool may be used for conversion, a word can be represented as a real value vector by using the tool, and the text content is simplified as a vector in a K-dimensional vector space through deep learning.

Step 103: Train the feature data, and obtain, through mining, at least one recommendation term corresponding to each candidate application.

In this step, a mining model mainly uses a machine learning technology. Feature vectors of each historical search term, each historical application, and each candidate application are separately generated according to the feature data obtained in step 102. In other words, a feature vector includes multiple pieces of obtained feature data. A training sample is generated according to the feature vectors to perform training, and then, the at least one recommendation term corresponding to each candidate application is obtained through mining.

During actual application, the feature vectors include non-linear separable features, and may be trained by using a gradient boosted decision tree (GBDT) algorithm. For the GBDT algorithm, refer to the processing method in the related art technology.

Step 104: Determine, when a current search term entered by the user is received from a client, at least one to-be-presented application from the candidate application according to the current search term and the at least one recommendation term, and send, to the client, a notification message of presenting the at least one to-be-presented application.

In an example embodiment, it is determined whether the current search term matches at least one recommendation term of a candidate application, if they fully or partially match, the candidate application is used as the to-be-presented application.

In another example embodiment, considering that the current search term entered by the user includes redundant information, a kernel search term may further be extracted from the current search term, and if the kernel search term fully or partially matches at least one recommendation term of a candidate application, the candidate application is used as the to-be-presented application.

In the foregoing example embodiment, at least one historical search term and a historical application accessed by a user and corresponding to the historical search term are determined, feature data of each historical search term, each historical application, and each candidate application are separately obtained, the feature data is trained, at least one recommendation term corresponding to each candidate application is obtained through mining, and when a current search term entered by a user is received from a client, at least one to-be-presented application is determined from the candidate application according to the current search term and the at least one recommendation term. In contrast to the related art, the recommendation term used as a basis for recommending an application is obtained through mining by comprehensively considering the feature data of the historical search terms, the historical applications, and the candidate applications. Compared with a related art manner of making a recommendation only according to text information of an application, according to the example embodiments, recommendation term mining sources are enriched, bases for recommending an application is extended, and a problem that the recommendation efficiency is low due to sparse text information during recommendation of an application is resolved. An appropriate and excellent application can be recommended to a user with reference to historical search behaviors of the user, so that customized application recommendation is implemented, and a resource utilization rate of the client is improved. Moreover, because the mining is performed prior to receiving the current search term, the speed of providing the applications to the client is increased, and processing and memory resources are saved.

Figure 2:
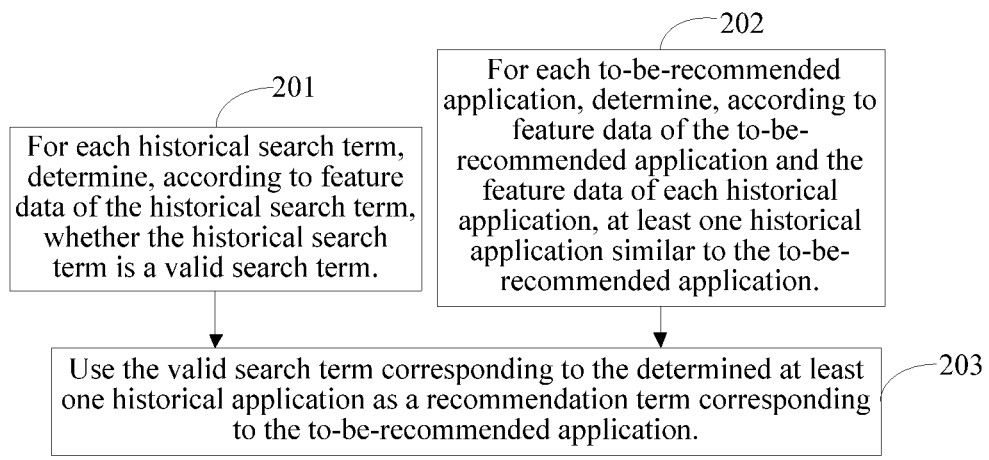
FIG. 2 is a schematic flowchart of a recommendation term mining method according to an example embodiment of this application.

When the at least one recommendation term corresponding to each candidate application is obtained through mining in step 103, FIG. 2 is a schematic flowchart of a recommendation term mining method according to an example embodiment of this application. Referring to FIG. 2, the method includes the following steps.

Step 201: For each historical search term, determine, according to the feature data of the historical search term, whether the historical search term is a valid search term.

As described in step 102, when the feature data includes entropy in (A1), a smaller value indicates more concentratively user click behaviors. Then, an entropy threshold is set, and a historical search term whose entropy value is less than the entropy threshold is determined as the valid search term.

For another example, when the feature data includes QV in (A2), if the number of times is larger, it indicates that the historical search term is a common key word. Then, a QV threshold is set, and a historical search term whose Qv value is greater than the QV threshold is determined as the valid search term.

For another example, when the feature data includes QL in (A3), if the length is longer, it indicates that the historical search term is not a common term. Then, a QL threshold is set, and a historical search term whose QL value is less than the QL threshold is determined as the valid search term.

For another example, when the feature data includes Tf in (A4), a higher word frequency indicates lower importance of the historical search term. Then, a Tf threshold is set, and a historical search term whose Tf value is less than the Tf threshold is determined as the valid search term.

Step 202: For each candidate application, determine, according to the feature data of the candidate application and the feature data of each historical application, at least one historical application similar to the candidate application.

The step is used to evaluate a similarity degree between a candidate application and a historical application. Specifically, as described in step 102, When the feature data includes a type in (B1), if a type of a recommended application is the same as that of a historical application, it is considered that the recommended application and the historical application have "similar types".

When the feature data includes a description term in (B2), if a description term of a recommended application is completely the same as that of a historical application, or when there are multiple description terms, some description terms are the same, it is considered that the recommended application and the historical application have "similar texts".

When the feature data includes a thematic term in (B3), if LDA of a recommended application and LDA of a historical application are the same or very similar (for example, the difference between two allocations falls within a preset range), it is considered that the recommended application and the historical application have "similar themes".

When the feature data includes a real value in (B4), if a recommended application and a historical application have a same Word2vec vector, it is considered that the recommended application and the historical application have "similar values".

Step 203: Use a valid search term corresponding to the determined at least one historical application as the recommendation term corresponding to the candidate application.

Each historical application corresponds to a search term, and when it is determined that a search term corresponding to the determined at least one historical application is a valid search term, the valid search term is used as the recommendation term corresponding to the candidate application.

For example, the candidate application is "Nike Parkour", and this is an advertisement APP. Similar historical applications include "Everyday Parkour", "Temple Run", and "Crazy Grandma". A valid search term corresponding to "Everyday Parkour" is "Parkour", valid search terms corresponding to "Temple Run" are "Parkour" and "extremity", and valid search terms corresponding to "Crazy Grandma" include "Parkour" and "entertainment", so as to determine that the recommendation terms of the candidate application "Nike Parkour" include "Parkour", "extremity", and "entertainment".

As can be learned, a recommendation term mining process is implemented in the following manner: enabling a historical search term to correspond to a historical application and associating a historical application and a candidate application that are similar. An obtained recommendation term is a valid search term in historical search terms, that is, the most representative historical search term.

Figure 3:
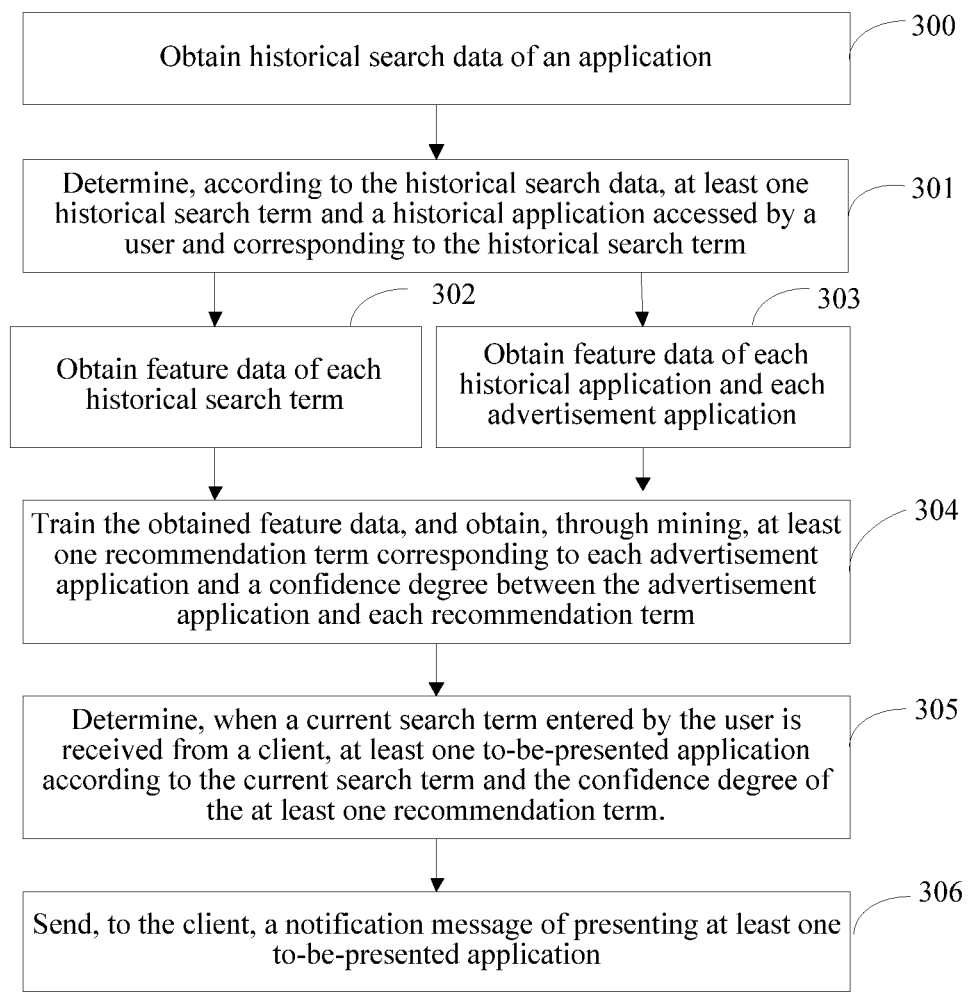
FIG. 3 is a schematic flowchart of an advertised application recommendation method according to another example embodiment of this application.

When the candidate application is an advertisement application, FIG. 3 is a schematic flowchart of an advertisement application recommendation method according to another example embodiment of this application. As shown in FIG. 3, the method includes the following steps.

Step 300: Obtain historical search data of an application.

Step 301: Determine, according to the historical search data, at least one historical search term and a historical application accessed by a user and corresponding to the historical search term.

For steps 300 and 301, refer to the description in step 101. One historical search term may correspond to multiple historical applications, and these historical applications may be common applications, or may include advertisement applications.

Step 302: Obtain feature data of each historical search term.

For example, the feature data includes four measures (A1) to (A4) in step 102.

Step 303: Obtain feature data of each historical application and each advertisement application.

For example, the feature data includes four measures (B1) to (B4) in step 102.

Step 304: Train the feature data, and obtain, through mining, at least one recommendation term corresponding to each advertisement application and a confidence coefficient between the advertisement application and each recommendation term.

Referring to step 103, when a GBDT algorithm is used for training, when the at least one recommendation term is obtained, through mining, for each advertisement application, the confidence coefficient between the advertisement application and each recommendation term is further output, and a value is in a range of 0-1, and is used to represent the credibility of the recommendation term.

Considering that the recommendation term mining process is implemented in the following manner: enabling a historical search term to correspond to a historical application and associating a historical application and a candidate application that are similar, a value of the confidence coefficient depends on a similarity degree between the advertisement application and a similar historical application, and a quantity of times of accessing a corresponding historical application when the recommendation term is used as a historical search term.

Step 305: Determine, when a current search term entered by the user is received from a client, at least one to-be-presented application according to the current search term and the confidence coefficient of at least one recommendation term.

If the current search term fully or partially matches a recommendation term corresponding to an advertisement application, the advertisement application is used as a spare application. All spare applications are sorted according to the confidence coefficient of the matched recommendation term, and the first M spare applications are used as at least one advertisement application according to a sorting result. M is a positive integer. When one advertisement application corresponds to multiple recommendation terms, matching is performed between the current search term and each recommendation term, and when the current search term fully or partially matches one recommendation term, the advertisement application is used as a spare application.

If the current search term entered by the user is "the most popular Parkour", referring to step 104, a kernel search term "Parkour" is extracted, a recommendation term fully matching the kernel search term is "Parkour", and the kernel search term corresponds to three advertisement applications: "Nike Parkour" (relating to Parkour products of NIKE), "Running Fury Leopard" (relating to products of a maximal exercise product company), and "Most Beautiful Running" (relating to products of body sculpting clothes for sporting), and the confidence coefficients between the three advertisement applications and the recommendation term "Parkour" are respectively 0.8, 0.5, and 0.7. If M=2, it is determined that "Nike Parkour" and "Most Beautiful Running" are advertisement applications presented to the user.

Step 306: Send, to the client, a notification message of presenting at least one to-be-presented application.

In this way, an application presented at the client is an advertisement application. During actual application, two types of applications are present to a user: a common application (that is, a non-advertisement application) and an advertisement application. The method in the foregoing example embodiment can be used as a recommendation method for the two types of applications.

Figure 4:
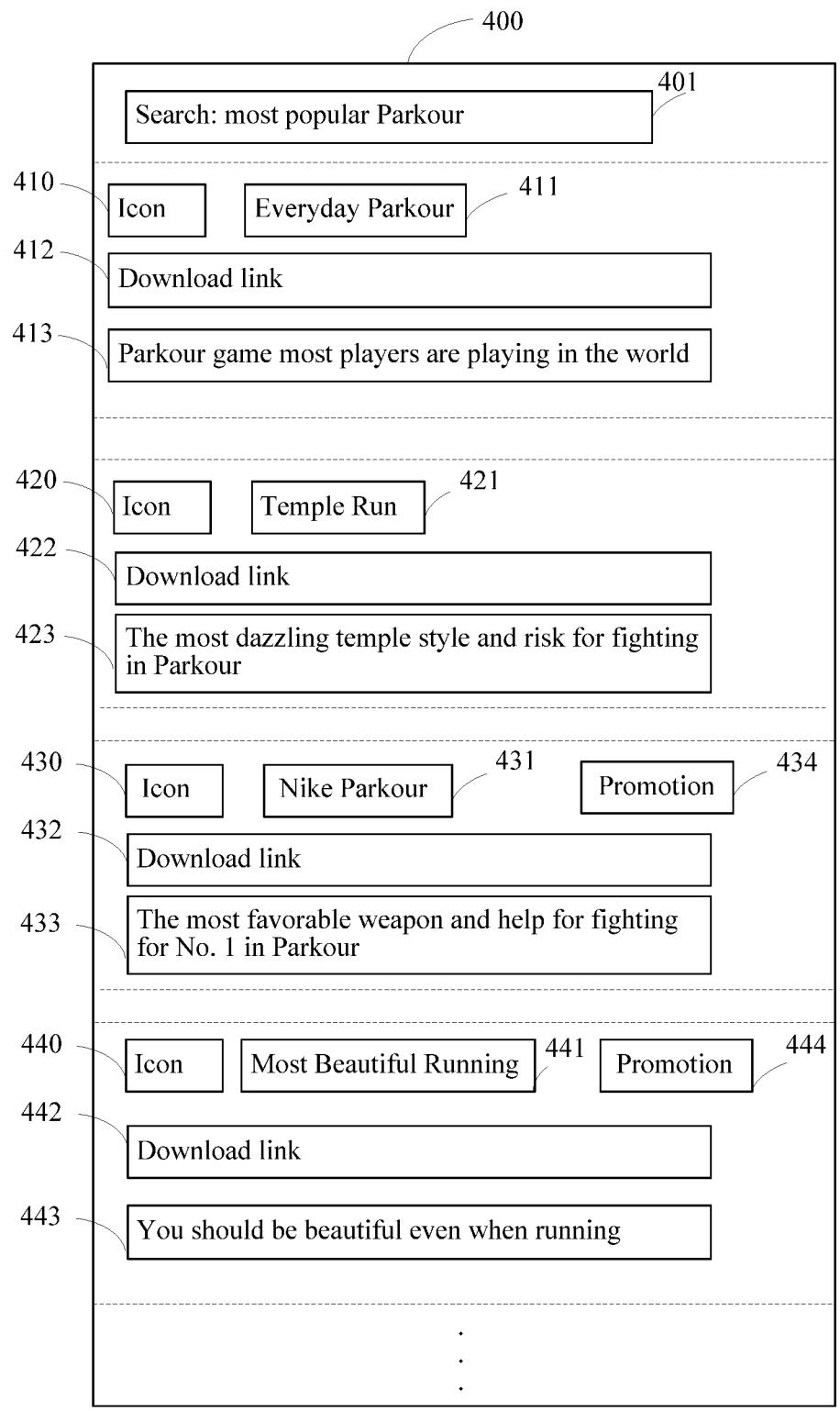
FIG. 4 is a schematic diagram of an interface for presenting an application according to an example embodiment of this application.

FIG. 4 is a schematic diagram of an interface 400 for presenting an application according to an example embodiment of this application. As shown in FIG. 4, the current search term entered by the user on a search box 401 is "most popular Parkour", the server returns, to the client, two common applications "Everyday Parkour" and "Temple Run" according to the current search term, and meanwhile, pushes two advertisement applications "Nike Parkour" and "Most Beautiful Running" to the client, so that the client can present these applications to the user together.

Specifically, boxes 410 to 413 respectively show an icon, a name, a download link, and recommendation information "Parkour game most players are playing in the world" of a common application "Everyday Parkour"; boxes 420 to 423 respectively show an icon, a name, a download link, and recommendation information "the most dazzling temple style and risk for fighting in Parkour" of a common application "Temple Run"; boxes 430 to 433 respectively show an icon, a name, a download link, and recommendation information "the most favorable weapon and help for fighting for No. 1 in Parkour" of an advertisement application "Nike Parkour"; and boxes 440 to 443 respectively show an icon, a name, a download link, and recommendation information "you should be beautiful even when running" of an advertisement application "Most Beautiful Running". Furthermore, in order to distinguish a common application from an advertisement application, a word "Promotion" is marked in boxes 434 and 444.

In addition, when to-be-presented applications include a common application and an advertisement application, the advertisement application may be presented on a client at multiple locations, and may further be presented at the top in addition to being presented between common applications as shown in FIG. 4. In other words, the advertisement application is preferentially presented before all common applications. This is not specifically limited in this application.

Figure 5:
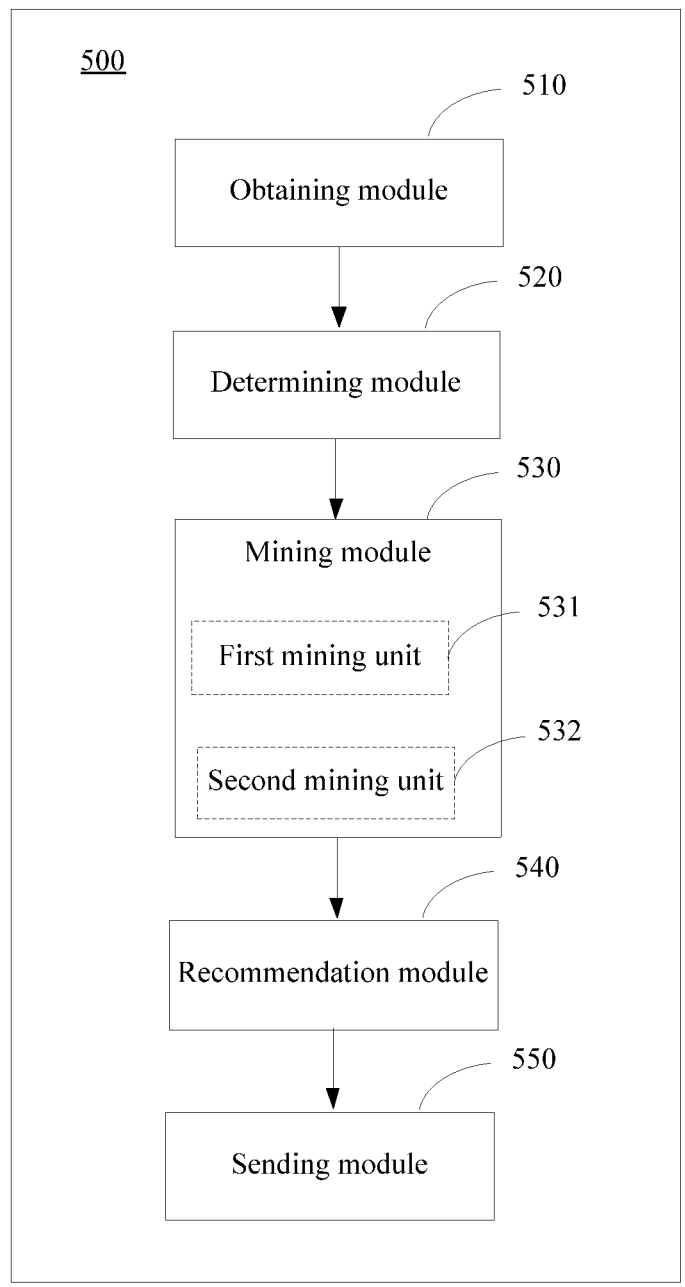
FIG. 5 is a schematic structural diagram of a server according to an example embodiment of this application.

FIG. 5 is a schematic structural diagram of a server according to an example embodiment of this application. As shown in FIG. 5, the server 500 includes:

an obtaining module 510, configured to obtain historical search data of an application;

a determining module 520, configured to determine, according to the historical search data obtained by the obtaining module 510, at least one historical search term and a historical application accessed by a user and corresponding to the historical search term;

a mining module 530, configured to separately obtain feature data of each historical search term obtained by the determining module 520, each historical application, and each candidate application, train the feature data, obtain, through mining, at least one recommendation term corresponding to each candidate application;

a recommendation module 540, configured to determine, when a current search term entered by a user is received from a client, at least one to-be-presented application from the candidate application according to the current search term and the at least one recommendation term obtained by the mining module 530; and a sending module 550, configured to send, to the client, a notification message of presenting the at least one to-be-presented application obtained by the recommendation module 540.

In an example embodiment, the determining module 520 is configured to obtain, from the historical search data, historical search information that is entered by the user when the user searches for an application, segment the historical search information, and extract a key word as a historical search term; for each historical search term, determine, from the historical search data, multiple historical applications corresponding to the historical search term, collect statistics on a quantity of times that users access each historical application in a predetermined time period, sort the multiple historical applications according to the quantities of times, and use the first L historical applications as the determined historical application according to the sorting result, where L is a positive integer.

In an example embodiment, the mining module 530 includes a first mining unit 531 and a second mining unit 532.

The first mining unit 531 is configured to: for each historical search term, determine a degree at which the historical search term is entered by users concentratively, and use the degree as feature data; and/or use, as feature data, a quantity of times that the historical search term is entered in a predetermined time period; and/or use a length of the historical search term as feature data; and/or use a frequency at which the historical search term occurs in all historical search terms as feature data.

The second mining unit 530 is configured to: for each historical application and each candidate application, use a type of the application as feature data; and/or obtain text description information of the application, segment the text description information, and obtain at least one description term as feature data; and/or recognize text description information, and obtain a thematic term of the application as feature data; and/or convert the text description information into a real value, and use the real value as feature data.

In an example embodiment, the mining module 530 is configured to: for each historical search term, determine whether the historical search term is a valid search term according to the feature data of the historical search term; for each candidate application, determine, according to the feature data of the candidate application and the feature data of each historical application, at least one historical application similar to the candidate application, and use a valid search term corresponding to the determined at least one historical application as a recommendation term corresponding to the candidate application.

In an example embodiment, the recommendation module 540 is configured to extract a kernel search term from the current search term; and when the kernel search term fully or partially matches at least one recommendation term of a candidate application, use the candidate application as the to-be-presented application.

In an example embodiment, the mining module 530 is further configured to: for each candidate application, determine a confidence coefficient between the candidate application and each recommendation term corresponding to the application.

The recommendation module 540 is configured to: when the current search term fully or partially matches a recommendation term corresponding to a candidate application, use the candidate application as a spare application; sort all spare applications according to confidence coefficients of matched recommendation terms, and use the first M spare applications as at least one to-be-presented application according to a sorting result, where M is a positive integer.

Figure 6:
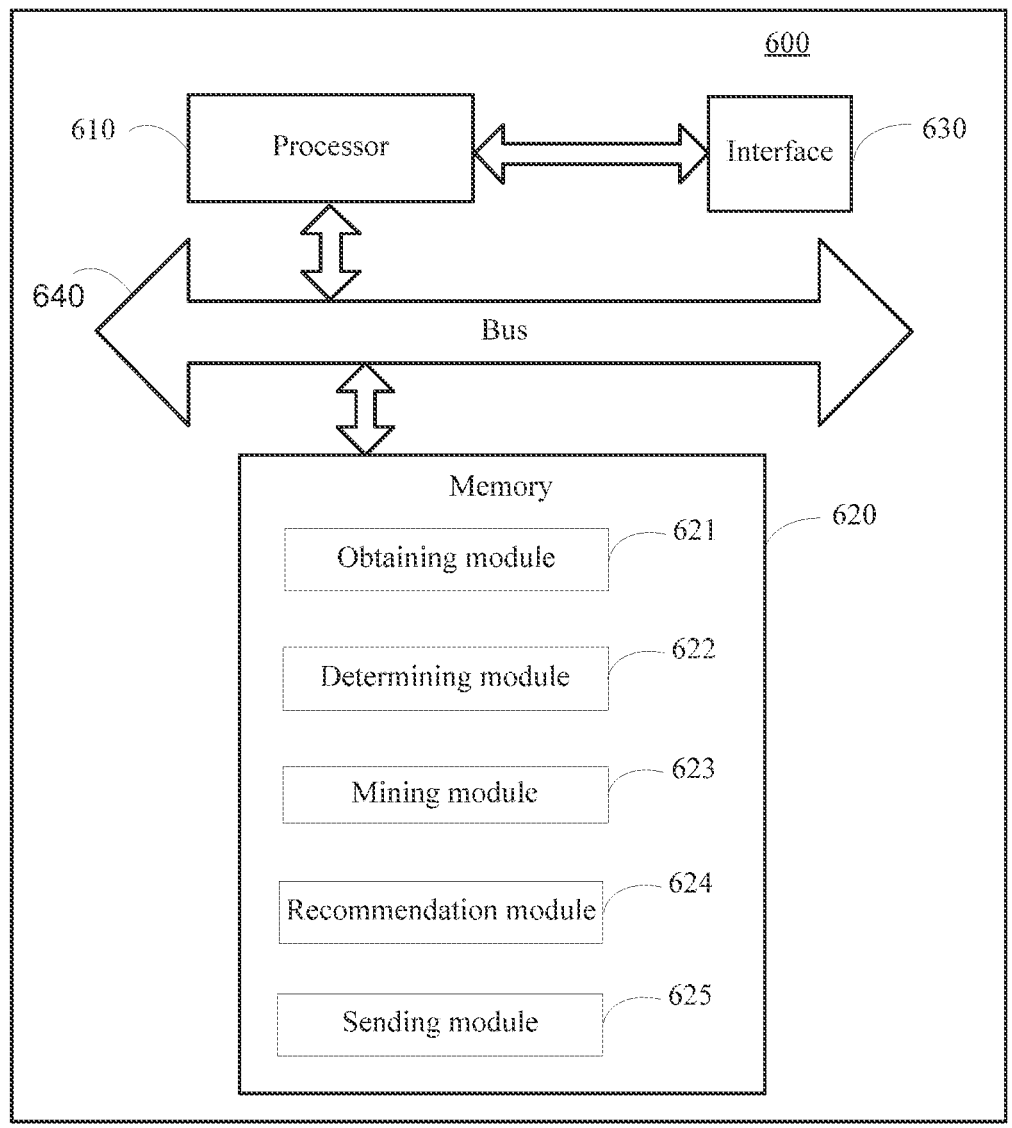
FIG. 6 is a schematic structural diagram of a server according to another example embodiment of this application.

FIG. 6 is a schematic structural diagram of a server according to another example embodiment of this application. The server 600 includes a processor 610, a memory 620, an interface 630, and a bus 640. The processor 610 and the memory 620 are interconnected through the bus 640. The processor 610 can receive and send data through the interface 630.

The processor 610 is configured to execute a machine readable instruction module stored in the memory 620.

The memory 620 stores a machine readable instruction module that can be executed by the processor 610. The instruction module that can be executed by the processor 620 includes an obtaining module 621, a determining module 622, a mining module 623, a recommendation module 624, and a sending module 625.

When being executed by the processor 610, the obtaining module 621 may obtain historical search data of an application.

When being executed by the processor 610, the determining module 622 may determine, according to the historical search data obtained by the obtaining module 621, at least one historical search term and a historical application accessed by a user and corresponding to each historical search term.

When being executed by the processor 610, the mining module 623 may separately obtain feature data of each historical search term obtained by the determining module 622, each historical application, and each candidate application, train the feature data, and obtain, through mining, at least one recommendation term corresponding to each candidate application.

When being executed by the processor 610, the recommendation module 624 may determine, when a current search term entered by a user is received from a client, at least one to-be-presented application from the candidate application according to the current search term and the at least one recommendation term obtained by the mining module 623.

When being executed by the processor 610, the sending module 625 can send a notification message of presenting at least one to-be-presented application obtained by the recommendation module 640 to the client.

Therefore, as can be learned, when the instruction module stored in the memory 620 is executed by the processor 610, various functions of the obtaining module, determining module, mining module, recommendation module, and sending module in each embodiment can be implemented.

In the server embodiment, the specific methods for each module and unit to implement their functions are all described in the method embodiment, and details are not described herein again.

In addition, functional modules in the example embodiments of this application may be integrated in one processing unit or exist independently and physically, or two or more modules may be integrated in one unit. The integrated unit may be implemented in a form of hardware or a software functional unit.

In addition, each example embodiment of this application may be implemented by a data processing program executed by a data processing device such as a computer. Obviously, the data processing program constitutes this application. In addition, generally, a data processing program stored in a storage medium is executed in the following manner: the program is directly read from the storage medium, or the program is installed onto or copied to a storage device (such as a hard disk or a memory) of the data processing device. Therefore, such storage medium also constitutes this application. The storage medium may use any type of recording manner, for example, a paper storage medium (for example, a paper tape), a magnetic storage medium (for example, a floppy disk, a hard disk, or a flash disk), an optical storage medium (for example, CD-ROM), or a magneto-optical storage medium (for example, MO).

Therefore, this application further discloses a storage medium storing a data processing program, and the data processing program is used to perform any method example embodiment of this application.

The foregoing descriptions are merely example embodiments of this application, but are not intended to limit the present disclosure. Any modification, equivalent replacement, or improvement made within the spirit and principle of the present disclosure shall fall within the protection scope of this application, and its appended claims.

What is claimed is:

1. A method comprising:
   prior to receiving a current search term from a client of an application store:
   obtaining, by at least one processor, for each of a plurality of users, a plurality of historical search terms entered by the user to the application store during a first time period and, for each historical search term, one or more historical applications accessed by the user from the application store in response to the historical search term;
   separately obtaining, by the at least one processor, feature data of each of the plurality of historical search terms, each of the one or more historical applications on the application store and each of a plurality of candidate applications on the application store, the candidate applications including common applications and at least one of promotional applications or advertising applications to be recommended and the feature data being data combined from all of the plurality of users;
   training, by the at least one processor, the feature data according to a mining model; and
   obtaining, by the at least one processor through mining using the trained feature data, for each of a plurality of candidate applications on the application store, at least one recommendation term corresponding to the candidate application, and storing the at least one recommendation term and the corresponding application in an application database; and
   in response to receiving the current search term from the client of the application store:
   determining, by the at least one processor, one or more applications from the plurality of candidate applications according to the recommendation terms in the application database and the current search term; and
   transmitting, by the at least one processor, a notification message of the one or more applications to the client application,
   wherein obtaining the feature data of each of the one or more historical applications on the application store and obtaining the feature data of each of the plurality of candidate applications on the application store comprises:

obtaining a type of the application from the application store, obtaining text description information of the application from the application store, recognizing the text description information, and recognizing a thematic term of the application from the recognized text description information using a thematic model, segmenting the recognized text description information into at least one description term for the application, and using the type of the application, the thematic term of the application, and the at least one description term of the application as the feature data for the application.

2. The method of claim 1, wherein each of the plurality of historical search terms is segmented into a plurality of keywords, and at least one keyword is extracted and used as the historical search term corresponding to the one or more historical applications.

3. The method of claim 1, wherein the one or more historical applications are sorted according to a number of times the user has accessed each historical application in a second time period.

4. The method of claim 1, wherein the feature data of the each of the historical search terms comprises:

a concentration degree with which the historical search term is entered by all of the plurality of users in a concentration time period;

a number of times the historical search term is entered by all of the plurality of users in a measurement time period;

a length in words or characters of the historical search term; and a frequency with which the historical search term occurs among a bag-of-words of all historical search terms entered by all of the plurality of users.

5. The method of claim 4, wherein the obtaining the at least one recommendation term comprises:

for each historical search term, determining according to the feature data of the historical search term, whether the historical search term is valid;

for each candidate application, determining according to the feature data of the candidate application and the feature data of each historical application, at least one similar historical application that is similar to the candidate application; and using a valid historical search term corresponding to the at least one similar historical application, as the at least one recommendation search term.

6. The method of claim 5, wherein the historical search term is determined as valid if:

the concentration degree of the historical search term is less than an entropy threshold;

the number of times the historical search term is entered is less than a quantity threshold;

the length of the historical search term is less than a length threshold; or the frequency of the historical search term is less than a frequency threshold.

7. The method of claim 1, wherein the obtaining the at least one recommendation term comprises:

for each historical search term, determining according to the feature data of the historical search term, whether the historical search term is valid;

for each candidate application, determining according to the feature data of the candidate application and the feature data of each historical application, at least one similar historical application that is similar to the candidate application; and using a valid historical search term corresponding to the at least one similar historical application, as the at least one recommendation search term.

8. The method of claim 7, wherein the at least one similar historical application is determined as similar to the candidate application if:

a type of the candidate application is a same type as a type of the historical application;

all description terms of the candidate application are same as all description terms of the historical application, or a portion of the description terms of the candidate application are same as some of the description terms of the historical application;

a thematic term of the candidate application is a same term as a thematic term of the historical application; or a vector of the candidate application is a same value as a vector of the historical term.

9. An apparatus comprising:

at least one memory configured to store computer program code; and at least one processor configured to access the at least one memory and operate according to the computer program code, the computer program code including:

prior to receiving a current search term from a client of an application store:

first obtaining code configured to cause at least one of the at least one processor to obtain, for each of a plurality of users, a plurality of historical search terms entered by the user to the application store during a first time period and, for each historical search term, one or more historical applications accessed by the user from the application store in response to the historical search term;

second obtaining code configured to cause the at least one of the at least one processor to separately obtain feature data of each of the plurality of historical search terms, each of the one or more historical applications on the application store and each of a plurality of candidate applications on the application store, the candidate applications including common applications and at least one of promotional applications or advertising applications to be recommended and the feature data being data combined from all of the plurality of users;

training code configured to cause the at least one of the at least one processor to train the feature data according to a mining model; and third obtaining code configured to cause the at least one of the at least one processor to obtain, through mining using the trained feature data, for each of a plurality of candidate applications on the application store, at least one recommendation term corresponding to the candidate application, and storing the at least one recommendation term and the corresponding application in an application database; and in response to receiving the current search term from the client of the application store:

determining code configured to cause the at least one of the at least one processor to determine one or more applications from the plurality of candidate applications according to the recommendation terms in the application database and the current search term; and transmitting code configured to cause the at least one of the at least one processor to transmit, by at least one processor, a notification message of the one or more applications to the client application, wherein the feature data of each of the one or more historical applications on the application store and obtaining the feature data of each of the plurality of candidate applications on the application store is obtained by:

obtaining a type of the application from the application store, obtaining text description information of the application from the application store, recognizing the text description information, and recognizing a thematic term of the application from the recognized text description information using a thematic model, segmenting the recognized text description information into at least one description term for the application, and using the type of the application, the thematic term of the application, and the at least one description term of the application as the feature data for the application.

10. The apparatus of claim 9, wherein each of the plurality of historical search terms is segmented into a plurality of keywords, and at least one keyword is extracted and used as the historical search term corresponding to the one or more historical applications.

11. The apparatus of claim 9, wherein the one or more historical applications are sorted according to a number of times the user has accessed each historical application in a second time period.

12. The apparatus of claim 9, wherein the feature data of the each of the historical search terms comprises:

a concentration degree with which the historical search term is entered by all of the plurality of users in a concentration time period;

a number of times the historical search term is entered by all of the plurality of users in a measurement time period;

a length in words or characters of the historical search term; and a frequency with which the historical search term occurs among a bag-of-words of all historical search terms entered by all of the plurality of users.

13. The apparatus of claim 12, wherein the third obtaining code comprises:

first determining subcode configured to cause the at least one of the at least one processor to, for each historical search term, determine according to the feature data of the historical search term, whether the historical search term is valid;

second determining subcode configured to cause the at least one of the at least one processor to, for each candidate application, determine according to the feature data of the candidate application and the feature data of each historical application, at least one similar historical application that is similar to the candidate application; and recommendation subcode configured to cause the at least one of the at least one processor to use a valid historical search term corresponding to the at least one similar historical application, as the at least one recommendation search term.

14. The apparatus of claim 13, wherein the historical search term is determined as valid if:

the concentration degree of the historical search term is less than an entropy threshold;

the number of times the historical search term is entered is less than a quantity threshold;

the length of the historical search term is less than a length threshold; or the frequency of the historical search term is less than a frequency threshold.

15. The apparatus of claim 9, the third obtaining code comprises:

first determining subcode configured to cause the at least one of the at least one processor to, for each historical search term, determine according to the feature data of the historical search term, whether the historical search term is valid;

second determining subcode configured to cause the at least one of the at least one processor to, for each candidate application, determine according to the feature data of the candidate application and the feature data of each historical application, at least one similar historical application that is similar to the candidate application; and recommendation subcode configured to cause the at least one of the at least one processor to use a valid historical search term corresponding to the at least one similar historical application, as the at least one recommendation search term.

16. The apparatus of claim 15, wherein the at least one similar historical application is determined as similar to the candidate application if:

a type of the candidate application is a same type as a type of the historical application;

all description terms of the candidate application are same as all description terms of the historical application, or a portion of the description terms of the candidate application are same as some of the description terms of the historical application;

a thematic term of the candidate application is a same term as a thematic term of the historical application; or a vector of the candidate application is a same value as a vector of the historical term.

17. A non-transitory computer readable storage medium storing computer program code which, when executed by at least one processor, performs:

prior to receiving a current search term from a client of an application store:

obtaining, by at least one processor, for each of a plurality of users, a plurality of historical search terms entered by the user to the application store during a first time period and, for each historical search term, one or more historical applications accessed by the user from the application store in response to the historical search term;

separately obtaining, by the at least one processor, feature data of each of the plurality of historical search terms, each of the one or more historical applications on the application store and each of a plurality of candidate applications on the application store, the candidate applications including common applications and at least one of promotional applications or advertising applications to be recommended and the feature data being data combined from all of the plurality of users;

training, by the at least one processor, the feature data according to a mining model; and obtaining, by the at least one processor through mining using the trained feature data, for each of a plurality of candidate applications on the application store, at least one recommendation term corresponding to the candidate application, and storing the at least one recommendation term and the corresponding application in an application database; and in response to receiving the current search term from the client of the application store:

determining, by the at least one processor, one or more applications from the plurality of candidate applications according to the recommendation terms in the application database and the current search term; and transmitting, by the at least one processor, a notification message of the one or more applications to the client application, wherein the feature data of the each of the historical search terms comprises:

a concentration degree with which the historical search term is entered by all of the plurality of users in a concentration time period;

a number of times the historical search term is entered by all of the plurality of users in a measurement time period;

a length in words or characters of the historical search term; and a frequency with which the historical search term occurs among a bag-of-words of all historical search terms entered by all of the plurality of users, and wherein obtaining the feature data of each of the one or more historical applications on the application store and obtaining the feature data of each of the plurality of candidate applications on the application store comprises:

obtaining a type of the application from the application store, obtaining text description information of the application from the application store, recognizing the text description information, and recognizing a thematic term of the application from the recognized text description information using a thematic model, segmenting the recognized text description information into at least one description term for the application, and using the type of the application, the thematic term of the application, and the at least one description term of the application as the feature data for the application.

18. The computer readable storage medium of claim 17, wherein the obtaining the at least one recommendation term comprises:

for each historical search term, determining according to the feature data of the historical search term, whether the historical search term is valid;

for each candidate application, determining according to the feature data of the candidate application and the feature data of each historical application, at least one similar historical application that is similar to the candidate application; and using a valid historical search term corresponding to the at least one similar historical application, as the at least one recommendation search term.

* * * * *